United States Patent Office 3,070,433
Patented Dec. 25, 1962

3,070,433
METHOD FOR CONTROLLING PLANT GROWTH
Hanshelmut Schlör, Wuppertal-Barmen, and Ludwig Eue, Koln-Mulheim, Germany, assignors to Farbenfabriken Bayer Aktiengesellschaft, Leverkusen, Germany, a corporation of Germany
No Drawing. Filed Dec. 29, 1959, Ser. No. 862,459
Claims priority, application Germany Jan. 2, 1959
4 Claims. (Cl. 71—2.7)

The present invention relates to and has as its objects a new method of controlling plant growth as well as compositions containing as active ingredients plant growth regulators of the following general formula

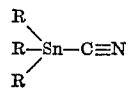

in which R stands for lower alkyl groups, preferably with 1 to 6 carbon atoms. These compounds are very well suited as agents for the control of plant growth, especially for combating weeds or as defoliating agents. Tri-n-butyl-tin-cyanide has proved especially effective in the aforementioned class.

The compounds of the above formula can be used for selective, as well as for total, weed destruction.

As weeds in the broadest sense of this invention, there are to be understood plants which grow where they are not desired. Representatives of the above mentioned class of compounds already act at low concentrations as herbicides. It has been found that seedlings and young plants are very strongly spoilt or eliminated and that e.g. in ground treatment, their germination is hindered.

Since the effect, at suitable concentrations, applies mostly against dicotyledonous plants (charlock, mustard, and cress, and the like), representatives of the aforesaid class of substances can be used for selective weed-killing. Since at higher concentrations all plant growth is destroyed and—as already stated above—germination is hindered, these substances are also suitable as total herbicides. The destruction of weeds can be carried out quite generally at any desired development stage of the plants.

The weed-killers can preferably consist of a mixture of the aforesaid class of substances and a solid or liquid extender, the addition of known herbicides or fertilizers being also possible.

The aqueous or oily dispersions, emulsions or solutions can further contain wetting agents, emulsifiers or other dispersing assistants. In the use of dusts or sprays the addition of adhesives sometimes is necessary or at least desirable.

As already stated above, the compounds to be used according to the invention, due to their drying-out (desiccative) action, are also suitable as defoliating agents, especially in cotton cultivation. With the agents of the present invention it is possible to achieve complete defoliation and easy mechanical cropping of the cotton bolls without damage thereto.

Tri-n-lower alkyl cyanides, e.g. the tri-n-butyl tin cyanide are known from the literature, see e.g. Investigations in the Field of Organotin Chemistry, J. G. A. Luigten and G. J. M. Van der Kerk; Tin Research Institute, Middlesex (England), October 1955.

Since the compounds to be used according to the invention as weed-killers or defoliants, also possess a remarkably high insecticidal action, a special advantage is associated in some cases with the use of the compounds according to the invention. At a rather low average toxicity ($LD_{50}$) on rats per os of 100 mg./kg. tri-n-butyl-tin cyanide has an outstanding activity against spider mites at concentrations of 0.001%, and a certain action against caterpillars, concentrations of 0.1%. The compounds of the invention also show noteworthy fungicidal properties.

The following examples are given for the purpose of illustrating the invention:

Example 1

In the green-house, mixed mustard and oat sowings (oats 10 cm. high, mustard 1 leaf-pair) were sprayed with 0.1% and 0.05% aqueous solutions of tri-n-butyl-tin-cyanide. The solutions have been prepared by mixing equal parts of the active ingredient and dimethyl formamide adding thereto the same amount by weight of nonylphenol polyglycol ether ($NP_{10}$) containing about 10 glycol residues in the molecule (commercially available) and diluting at last this premixture with water to the aforeshown concentration.

At both concentrations the plants died after the treatment. If the concentrations of the active substances are lowered to 0.01%, strong damage still occurs, without the plants being killed completely.

Example 2

Mixed mustard and oat sowings were sprayed with tri-n-butyl-tin-cyanide 24 hours after sowing. Aqueous solutions were used (prepared as described in Example 1, but using as an auxiliary solvent acetone) in amounts between 7.5 and 30 kg./hectare. At all stages of treatment the mustards were eliminated, while the oats grew without harm. The compound is accordingly suitable as a selective pre-emergence herbicide.

Example 3

Dwarf beans were sprayed in the green-house with 0.2, 0.1 and 0.05% aqueous solutions of tri-n-butyl-tin-cyanide (prepared as described above with emulsifiers and acetone). After treatment, the leaves were partly thrown off or dried up. This experiment illustrates application as a desciccant with leguminous plants.

Example 4

Potato stems and tops are killed off by treatment with tri-n-butyl-tin-cyanide in 1 and 0.5% aqueous solutions (with emulsifier and acetone prepared as shown above).

Similar results were obtained when tri-n-propyl-, tri-isopropyl- or triamyl-tin-cyanides are used instead of the tri-n-butyl-tincyanide.

Example 5

In an open land experiment in Alabama, cotton was treated shortly before picking, with 0.5 and 0.2% aqueous solutions of tri-n-butyl-tin-cyanide (with emulsifier and solvent as described above). After 7 days, at 0.5% application, complete defoliation could be determined. Even 0.2% spraying still brought about 75% defoliation after 7 days.

We claim:
1. A method of controlling plant growth which comprises treating plants with an effective amount of tri-n-butyl-tin-cyanide.
2. A method for killing a dicotyledonous plant which comprises treating the plant with an effective amount of tri-n-butyl-tin-cyanide.
3. A method of defoliating a plant which comprises treating a plant with a defoliating amount of tri-n-butyl-tin-cyanide.
4. The method of claim 3 wherein the plant is a cotton plant.

References Cited in the file of this patent
FOREIGN PATENTS
215,713    Australia _____ June 19, 1958
OTHER REFERENCES
Van der Kerk: J. "Appl. Chem.," vol. 4, #6, pages 314 to 318, 1954.